United States Patent
Schmidt et al.

[11] Patent Number: 5,156,187
[45] Date of Patent: Oct. 20, 1992

[54] SANITARY MIXER TAP SYSTEM

[75] Inventors: Heinz W. Schmidt, Stuttgart; Werner J. Weinmann, Filderstadt, both of Fed. Rep. of Germany

[73] Assignee: Hansa Metallwerke AG, Fed. Rep. of Germany

[21] Appl. No.: 823,774

[22] Filed: Jan. 22, 1992

[30] Foreign Application Priority Data

Jan. 25, 1991 [DE] Fed. Rep. of Germany ....... 4102135

[51] Int. Cl.$^5$ ............................................. F16K 11/24
[52] U.S. Cl. ................................. 137/607; 251/30.02; 137/614.17
[58] Field of Search .................. 137/607, 597, 614.17; 251/129.04, 30.02, 30.05

[56] References Cited

U.S. PATENT DOCUMENTS

| | | | |
|---|---|---|---|
| 2,766,774 | 10/1956 | Mornard | 137/607 X |
| 3,118,646 | 1/1964 | Markey | 251/30.05 X |
| 3,145,967 | 8/1964 | Gardner | 251/30.05 X |
| 3,245,430 | 4/1966 | Enterante | 137/597 X |
| 3,420,272 | 1/1969 | Corlett | 137/607 X |
| 3,472,283 | 10/1969 | Christiansen | 137/607 X |
| 3,870,080 | 3/1975 | Landwehr | 137/614.17 X |
| 4,741,363 | 5/1988 | Hu | 251/129.04 X |
| 5,050,641 | 9/1991 | Shwu-Fen | 251/129.04 X |

FOREIGN PATENT DOCUMENTS 3196 of 1906 United Kingdom ................. 137/607

Primary Examiner—Stephen M. Hepperle
Attorney, Agent, or Firm—Fred Philpitt

[57] ABSTRACT

An electrically operated sanitary mixer tap system comprises a hollow piston (17) for adjusting the temperature, which in particular may be a rotary piston. The hollow piston (17) moves in a chamber (21) of the housing (1) of the mixer tap system, into which the flow paths (22, 23) for cold and hot water open. A particular structure (27) on the outside of the hollow piston (17) cooperates with the openings of the flow paths (23, 27) and thus determines the mixing ratio of the mixed water flowing out of the fitting. Its further path to the outlet of the sanitary fitting leads at least in regions through the interior of the hollow piston (17). Located at this point are (at least) the closing members (30, 34) of an electrically operated valve, which in this way controls the flow of mixed water to the outlet of the fitting. This arrangement of the closing members (30, 34) radially inside the hollow piston (17) facilitates a particularly space-saving construction (FIG. 4).

9 Claims, 6 Drawing Sheets

SANITARY MIXER TAP SYSTEM

The invention relates to a sanitary mixer tap system with a housing, with an electrically operated valve, whereof the closing members control the mixed water flowing out, with a regulating member disposed in a chamber of the housing, which determines the ratio of cold and hot water in the mixed water flowing out, and with an outlet.

One problem in all known, electrically operated sanitary fittings, in particular also in sanitary fittings controlled in a non-contacting manner, is the space which is required by the mechanical and electrical components. If all these components are to be combined within the sanitary fitting, this frequently produces a bulky, unattractive appearance. This is increasingly true if the electrically operated sanitary fitting is a mixer tap system, in which by way of addition a regulating member for adjusting the mixing ratio of cold and hot water must be provided.

In known sanitary mixer tap systems of the aforementioned type, the regulating member determining the mixed water temperature and the electrically operated valve (generally a pure shut-off valve) were separated spatially from each other.

It is the object of the present invention to design a sanitary mixer tap system of the aforementioned type so that at least the regulating member and electrically operated valve require less space and thus the mixer tap system may acquire a more attractive appearance.

This object is achieved according to the invention due to the fact that a) the regulating member is constructed as a hollow piston;
b) on its outer periphery the hollow piston has a structure which in cooperation with flow paths for cold and hot water opening into the housing chamber, determines the mixing ratio thereof;
c) the path of the mixed water leads at least partly through the interior of the hollow piston and located in this region of the interior of the hollow piston are at least the closing members of the electrically operated valve.

Thus, according to the invention, at least the closing members of the electrically operated valve are located within the regulating member itself, which for this purpose is designed as a hollow piston. For this purpose, a water guide way must be selected, in which the path of the mixed water in the direction of the outlet of the fitting passes at least partly through the interior of the hollow piston. The closing members of the electrically operated valve in this way follow all the movements of the hollow piston. Due to the mutual nesting of the regulating member and closing members of the electrically operated valve, not only is considerable space saved; a component is thus produced, in which all the mechanical members of the sanitary mixer tap system are combined, which can thus be removed as a unit from the sanitary mixer tap system and possibly serviced or even exchanged.

Appropriately formed on the hollow piston is a cylindrical apron, to which an actuating handle can be attached. Generally, it is still customary, even with electrically operated sanitary fittings or sanitary fittings controlled in a non-contacting manner, to carry out the temperature adjustment manually.

In this embodiment, the space surrounded by the apron can also be utilised wisely: generally, namely electrically operated valves comprise a magnetic coil. According to a particular feature of the invention, the latter may be located in the space surrounded by the apron of the hollow piston.

The structure on the outer periphery of the hollow piston, which determines the mixing ratio of the water flowing out, may in particular comprise a groove, which guides the mixed water along the outside of the hollow piston. After entering the housing chamber, in which the hollow piston moves, the water path thus leads first of all along the outside of the hollow piston, before the mixed water is then guided into the inside of the hollow piston and to the closing members of the electrically operated valve located there.

It is simplest if the groove guides the mixed water to the open end of the hollow piston.

Very frequently the regulating member is constructed as a rotary piston. That construction is then recommended in which the groove is guided in the manner of a coil along the outer periphery of the hollow piston at an angle with respect to the axis and in which furthermore the centre points of the openings of the flow paths for cold and hot water in the housing chamber, are located on a straight line, which is parallel to the axis of rotation of the hollow piston. Depending on the rotary position, the "obliquely" extending groove intersects the two openings of the flow paths for cold and hot water in a different manner. This means that depending on the rotary position, different quantities of cold and hot water may flow from the corresponding flow paths into the groove and from there into the interior of the hollow piston.

Generally, for high-energy reasons, pilot-controlled valves are used as the electrically operated valves. As the closing member, these valves comprise a resilient diaphragm, which is able to move to and fro under the influence of the pressures prevailing on its two sides, between an open and a closed position, in which case a closing body able to move by means of the magnetic coil influences the pressures on both sides of the diaphragm by opening and closing a pilot opening. Such a pilot controlled valve can be made particularly useful for the purposes according to the invention, if the closing body and pilot opening are disposed at a distance from the diaphragm in the vicinity of the magnetic coil, in which case from the pilot opening a first channel leads through a solid region of the hollow piston into a chamber, in which the pressure prevailing on one side of the diaphragm is present and from the chamber, which after the lifting of the closing body from the pilot opening becomes connected to the first channel, a second channel is guided through a solid region of the hollow piston into a chamber, in which the pressure prevailing on the other side of the diaphragm exists. Due to the spatial separation of the resilient diaphragm and closing body as well as the pilot opening, the spatial relationships on or in the hollow piston can be better utilised, the two said channels serving to supply the pressures prevailing on both sides of the diaphragm.

Particularly favourable from a spatial point of view is that embodiment of the invention, in which the closing members of the electrically operated valve comprise:

a) a tubular, resilient diaphragm, which is fixed at its ends to the inner wall of the hollow piston and is able to move radially in the central region;

b) an abutment member disposed within the tubular, resilient diaphragm, against the surface of which the diaphragm bears in the closed position and from the surface of which the diaphragm lifts in the open position.

In this case the abutment member is preferably part of a cage holding the diaphragm, which at the axial ends respectively comprises a support ring, which cooperates with a radial flange on the corresponding axial end of the diaphragm, the two support rings being connected by way of ribs to the abutment member. In this way, the closing members of the electrically operated valve are combined as one unit, which can be inserted as a whole into the inside of the hollow piston. This unit may possibly also be exchanged as a whole.

One embodiment of the invention will be described in detail hereafter with reference to the drawings, in which.

Figure 1:
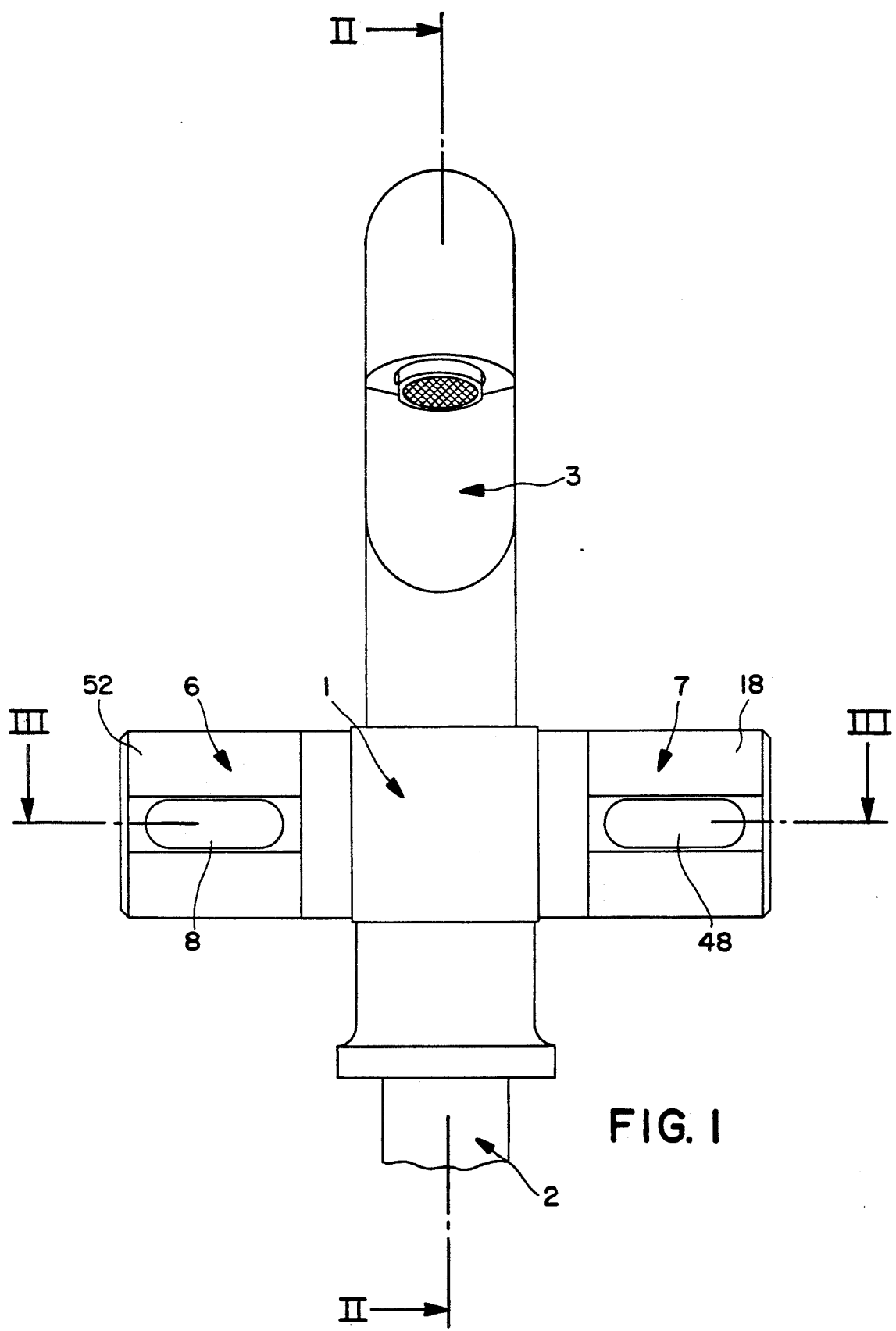
FIG. 1 is a front view of a sanitary fitting controlled in a non-contacting manner.

As can be seen from FIG. 1 of the drawings, the illustrated sanitary fitting controlled in a non-contacting manner can be divided into five main components:

A swivel outlet 3 is fitted onto a central main housing 1, to which a base part 2 is attached on the under side. Inlet channels 4 for hot and cold water (one of which is shown in broken line in FIG. 2) pass through the base part 2. Flexible water-supply hoses 5 are screwed into the latter from below.

Two handle-like attachments 6 and 7 are connected to the main housing 1 symmetrically with respect to the sectional plane II—II shown in FIG. 1.

Figure 3:
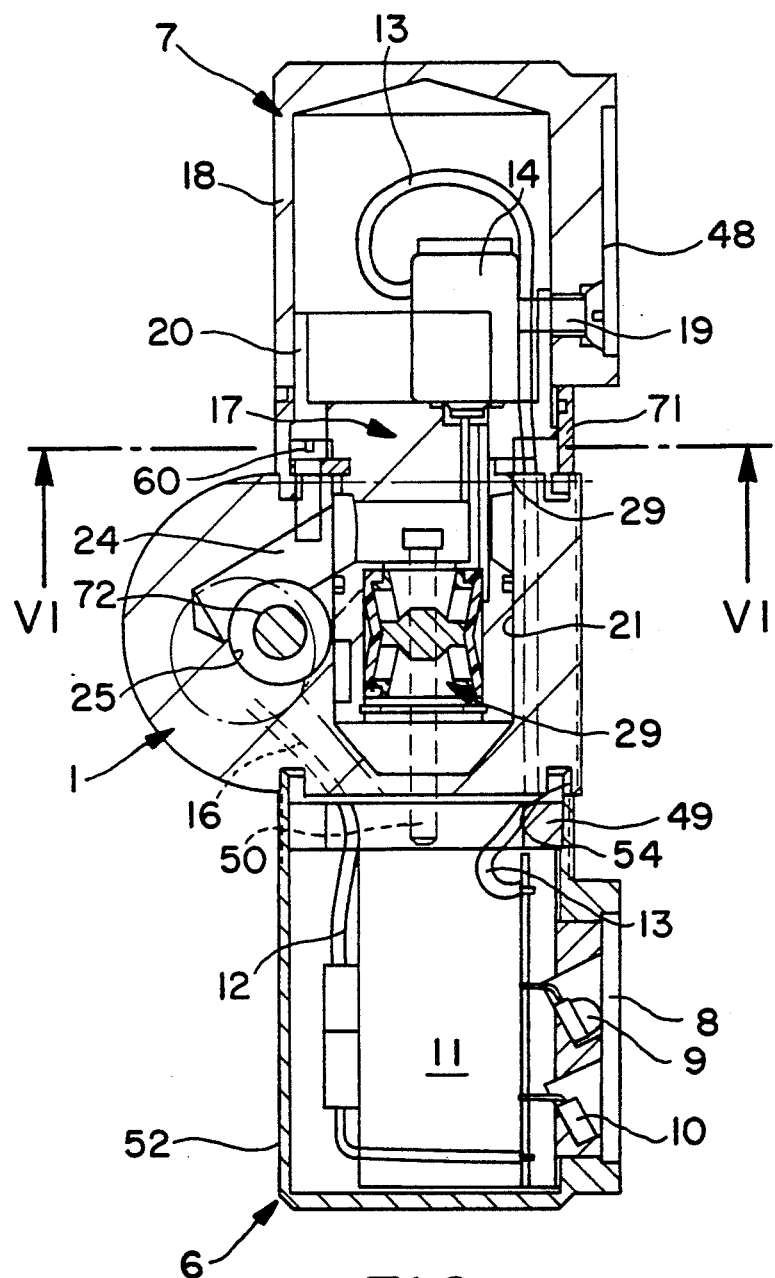
FIG. 3 is a section on line III—III of FIG. 1.

The left-hand handle-like attachment 6 has solely the outer appearance, but not the function of a handle. It serves exclusively for receiving the electronic components of the fitting controlled in a non-contacting manner. In FIG. 1 and FIG. 3, the optical inlet and outlet window 8 for the infrared light used for detecting a user is illustrated. The window 8 is dark so that its function as an optical window and the emitting diode 9 as well as the receiving diode 10 located therebehind are not visible (see the sectional view of FIG. 3). FIG. 3 shows how the electronics 11 are located inside the handle-like attachment 6, to which electronics the supply voltage is supplied on the one hand by way of a cable 12 and which on the other hand are connected by way of a further cable 13 in a manner to be described hereafter, to a solenoid valve 14, which controls the flow of water. The cable 12 is guided out of the sanitary fitting by way of an axis parallel bore 15 in the main housing 1 or the base part 2 and an inclined bore 16 in the main housing 1.

The arrangement is obviously such that combined as one unit in the handle-like attachment 6 are all those components which can be referred to as "electronic" in the sense that they serve for the electrical detection of a user in front of the sanitary fitting and for the production of those signals by which a solenoid valve can be controlled.

In the embodiment illustrated, the right-hand handle-like attachment 7 is not solely "handle-like", thus not only looks like a conventional sanitary fitting handle, but in fact has this function. It can be rotated about its horizontal axis namely for adjusting the temperature of the mixed water flowing out of the sanitary fitting. In a sanitary fitting, which delivers exclusively water at a single temperature, the attachment 7 would also be solely handle "like", thus would not actually have the function of a handle, but would solely give the appearance of the presence of such a handle.

Located or mounted as a unit in the handle-like attachment 7 are all those components which serve to control the water flow and in this sense can be regarded as "mechanical". Belonging in particular to these mechanical components is a magnetically actuated pilot valve, whereof the construction will be described in detail hereafter, as well as a rotary piston 17, also known as a "friction member", combined structurally with the latter, for adjusting the temperature.

Figure 2:
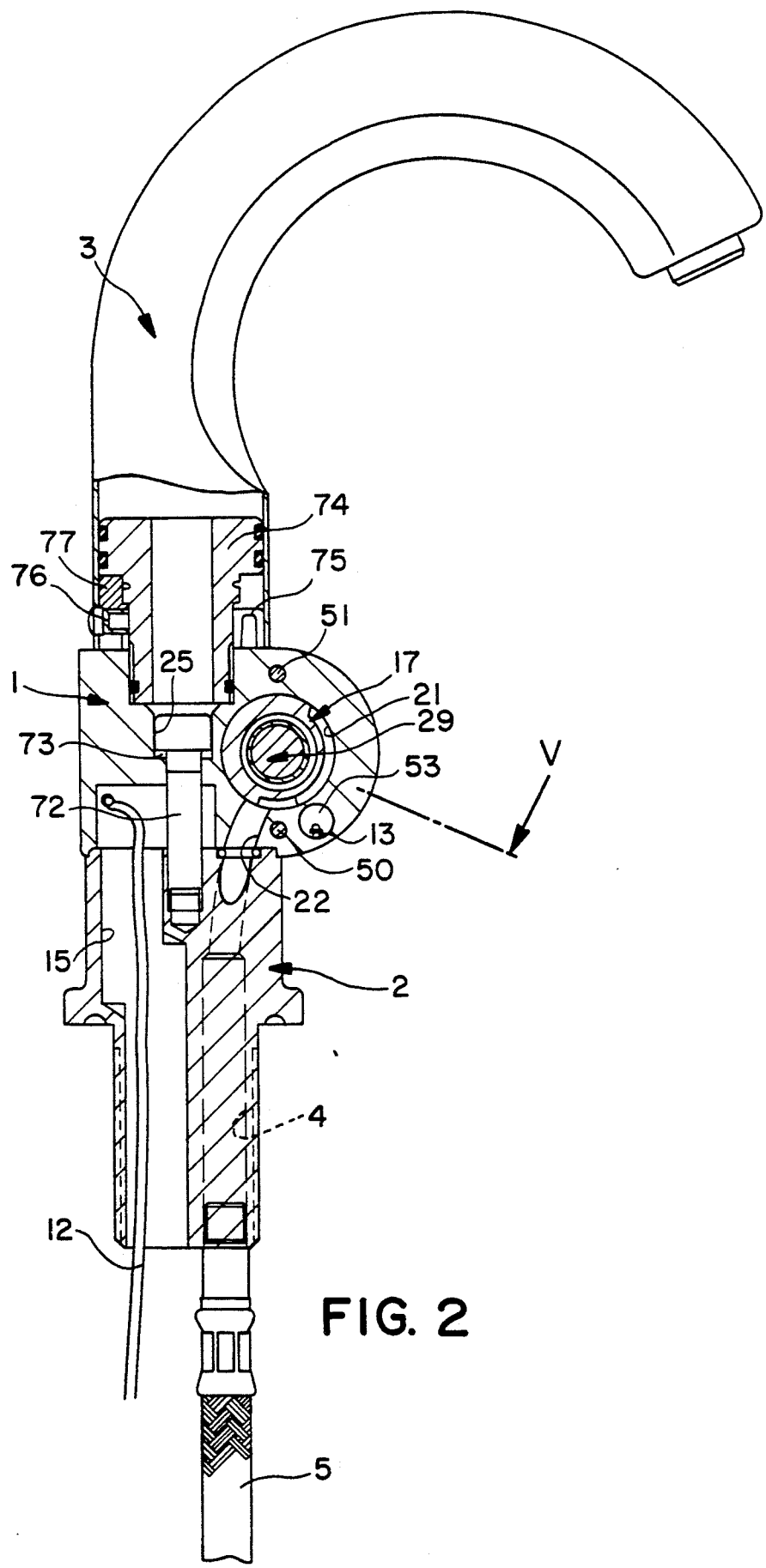
FIG. 2 is a section on line II—II of FIG. 1.

For a more accurate description of what is located in or on the handle-like attachment 7, reference will now be made to FIGS. 4 and 5, which are drawn to a larger scale than FIGS. 1 to 3. The cup-shaped outer housing 18 of the handle-like attachment 7 is omitted in FIGS. 4 and 5 for the sake of clarity. It is attached by a screw 19 to a cylindrical apron 20 of the friction member 17, as can be seen from FIG. 3. When the outer housing 18 is rotated, the entire friction member 17 is thus entrained, which changes the mixing ratio of cold and hot water in a manner to be described hereafter.

The friction member 17 is a one-piece shaped part, which at the end remote from the apron 20 projects into a cylindrical chamber 21 of the main housing 1. Opening into this chamber 21 are bores 22, 23 guided obliquely through the main housing 1 (see also FIG. 5), which communicate with the bores 4 in the base part 2 and through which cold and hot water may thus pass into the cylindrical chamber 21. Staggered axially with respect to the bores 22 and 23, a further bore 24 of the main housing 1 opens into the cylindrical chamber 21, which bore 24 is connected to a vertical bore 25 leading to the outlet 3. This can be seen particularly in FIG. 3. Thus, if the inner end of the friction member 17 were not inserted in the cylindrical chamber 21, then the water flowing in by way of the hoses 5, the channels 4, 22 and 23 into the cylindrical chamber 21 of the main housing 1 could flow directly through the bores 24 and 25 to the outlet 3.

The adjustment of the mixing ratio of cold and hot water takes place by a substantially cylindrical head 26 of the friction member 17, in which an obliquely extending groove 27 is provided. Depending on the rotary position, the groove 27 intersects the channels 22 and 23 in the main housing in a different manner. FIG. 5 shows the position in which equal proportions of cold and hot water are received, because the channels 22 and 23 both open to the same extent, namely up to half, into the groove 27. Therefore water may flow from the channels 22 and 23 into the groove 27. The groove 27 guides the water to be mixed into a recess 28 on the outer periphery of the head 26 of the friction member 17, from where it may pass to the end face of the friction member 17.

An elastic pad 79 is let into the lower region of the surface of the friction member head 26. If the friction member 17 is rotated into the full cold position, the pad 79 lies above the opening of the bore 22 supplying hot water and seals the latter hermetically. Due to this hot water losses are avoided.

The further path of the mixed water arriving at the open end face of the friction member 17, to the channel 24 and thus to the outlet 3 passes by way of the interior of the hollow head 26 of the friction member 17, in which a pilot-controlled valve 29 is located, as well as by way of a radial bore 44 in the friction member 17 and an annular chamber 78, which lies between the wall of the chamber 21 and a region of the friction member 17 of reduced diameter. The annular chamber 78 is limited in the axial direction by two O-rings 56 and 57, which are located in grooves on the surface of the friction member 17.

Without the pilot-controlled valve 29, the water arriving at the inner end face of the head 26 of the friction member 17 could flow freely through the interior of the friction member 17 to the channel 24.

As closing members, the pilot-controlled valve 29 comprises a diaphragm 30 of resilient material as well as a cage 31 of rigid synthetic material, with which the diaphragm 30 cooperates. This is shown in one piece in the drawing, but could also be constructed in several pieces.

The resilient diaphragm 30 is in the shape of two truncated cones placed one on the other in opposite directions, beads 32, 33 projecting radially inwards being formed on the axially opposing ends.

The cage 31 comprises a central abutment member 34 as well as respectively one support ring 35 or 36 at the two axial ends, which ring cooperates with the bead 32, 33 located there of the resilient diaphragm 30. The abutment member 34 of the cage 31 is connected by ribs 37 to the support rings 35, 36 to form one unit.

The cage 31 and diaphragm 30 attached thereto bear against a step in the inside of the friction member and are secured detachably at the outer end by a packing 46 and a spring ring 47. The resilient diaphragm 30 is shaped so that normally, thus without the action of pressure by water, from the inside or outside, it bears against the outside of the abutment member 34 of the cage 31. This is the closed state of the pilot-controlled valve 29, since then the water path through the interior of the friction member 17 to the channel 24 is blocked by the abutment member 34 and the diaphragm 29.

The diaphragm 29 is able to move from the closed position illustrated into an open position, in that it lifts in the central region from the abutment member 34 and bears against the wall of the cylindrical chamber 21 of the main housing 1. In this case an annular chamber between the diaphragm 29 and the abutment member 34 is released for throughflow.

This movement of the diaphragm 30 takes place under the influence of the pressures, which exist radially inside and radially outside the latter. These processes are known per se and do not need to be explained here in detail. In the present context, it is sufficient to know the following:

The interior of the diaphragm 29 lying below the abutment member 34 is connected by a small radial equalizing bore 38 to the outer chamber. The latter once more communicates by way of an axis parallel channel 39 with a recess 40 on the outer end face of the friction member 17 lying radially within the apron 20. The recess 40 is covered by the under side of the magnetic coil 14 and sealed by an O-ring 45. Formed on the base of the recess 40 is a valve seat 41, which cooperates with a closing member 42. The closing member 42 normally closes the valve seat 41 and thus access to an axis parallel channel 43, which leads to the radial bore 44 in the friction member 17 and thus to the channel 24 in the main housing 1.

Figure 4:
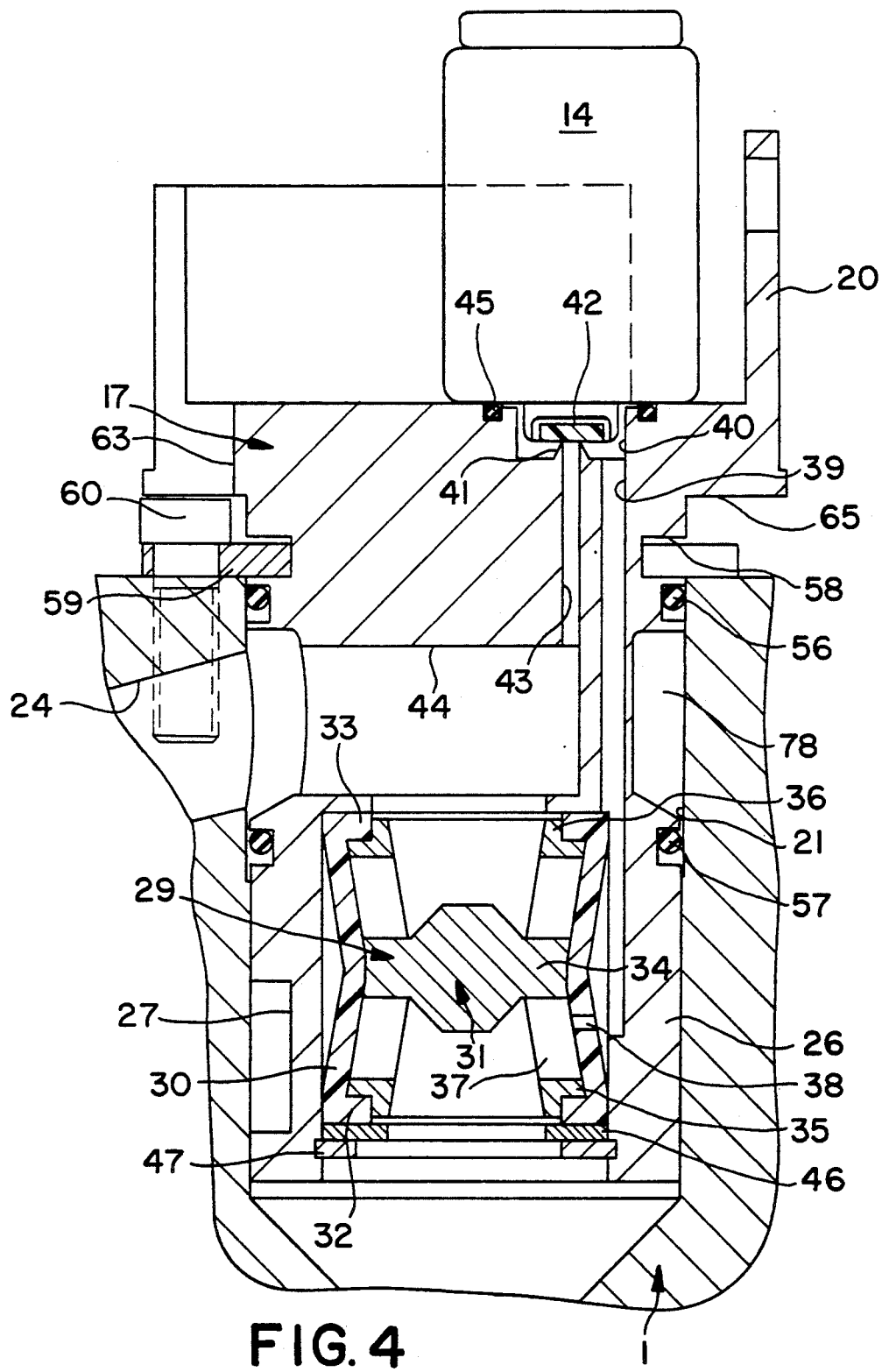
FIG. 4 is a cutaway view from FIG. 3, to an enlarged scale.
Figure 5:
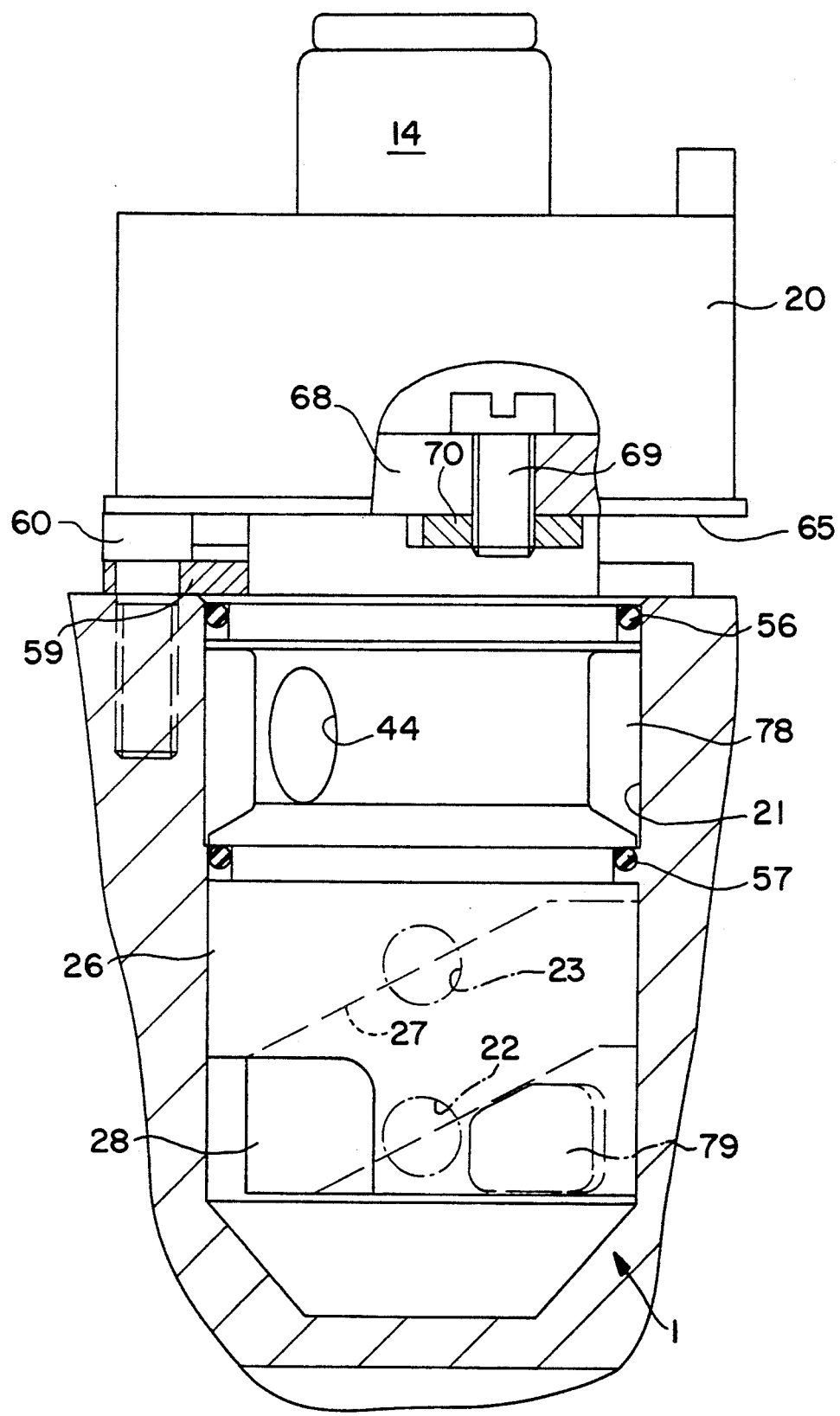
FIG. 5 is a view, similar to FIG. 4, but in section in the direction of arrow V in FIG. 2 (rotary piston not shown in section)
Figure 6:
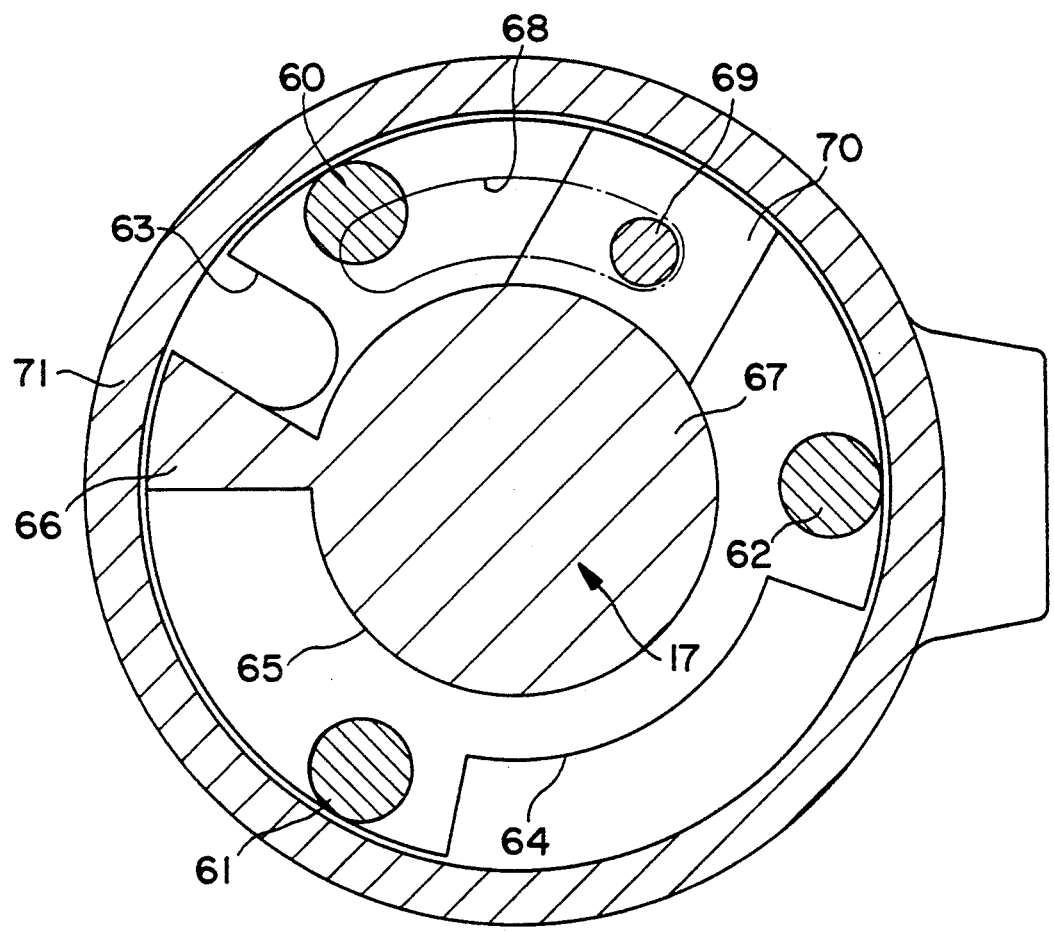
FIG. 6 is a section on line VI—VI of FIG. 3, to an enlarged scale.

As long as the closing member 42 closes the valve seat 41, as is shown in FIG. 4, the compressive force acting from outside on the resilient diaphragm 30 is greater than the resulting compressive force prevailing in the inner chamber of the diaphragm 29. The diaphragm 30 therefore remains in contact with the outer periphery of the abutment member 34 of the cage 31; the pilot-controlled valve 29 is closed.

However, if current is supplied to the coil 14 of the pilot-controlled valve, the closing member 42 lifts from the valve seat 41. This results in a change of the pressures acting on the diaphragm 30 in the sense that the diaphragm 30 lifts from the abutment member 34 in the central region and moves into the open position, in which it bears against the inner wall of the head 26 of the friction member 17.

At the time of assembly of the sanitary fitting controlled in a non-contacting manner, first of all the units held or formed by the handle-like attachments 6 and 7 are pre-assembled.

For the handle-like attachment 6 this means that the emitting diode 9 as well as the receiving diode 10 and the electronics 11 are introduced and attached in its housing 52 from the open end. At its open end, the housing 52 has a screw thread, into which a ring 49 is screwed. Two screws 50, 51 (see also FIG. 2) extend transversely through the main housing 1 and are rotated by their threaded end into threaded bores of the ring 49. The heads of the screws 50, 51 thus bear against a recess in the side face of the main housing 1 on the right in FIG. 1. The left-hand handle-like attachment 6 is thus attached to the main housing 1. Due to the use of the ring 49 and of the screws 50, 51, it is possible to fix the angular orientation of the housing 52 and thus the alignment of the optical window 8 accurately, which would not be possible if the housing 52 of the left-hand handle-like attachment 6 was simply screwed by the end into the main housing 1.

Before the final fixing of the handle-like attachment 6 to the main housing 1, naturally the cable 12 is guided through the channels 15 and 16; the cable 13 is guided through a channel 53 completely penetrating the main housing 1 (see also FIG. 2) to the other side face of the main housing 1.

A cylindrical collar 54 on the inner end of the housing 52 projects into a groove on the side face of the main housing 1 on the left in FIG. 1. This produces a visually attractive transition between the handle-like attachment 6 and the main housing 1.

The fastening of the handle-like attachment 7, on the right in FIG. 1, which in fact is a genuine handle, takes place in the following manner (the following description refers in particular to FIGS. 3 to 6):

The frictional member 17 is provided with a groove 58 at that axial point where, in the installed state, the side face of the main housing 1 on the right in FIG. 1 comes to lie. A U-shaped fastening part 59 is inserted from the side in this groove 58. This fastening part is screwed securely by three screws 60, 61 and 62 to the side face of the main housing 1 on the right in FIG. 1. One of these screws, namely the screw 60, is illustrated in FIGS. 4 and 5; all three screws can be seen in FIG. 6, which is a section on line VI—VI of FIG. 3, at the height of the heads of the screws 60, 61, 62. The heads of the screws 60, 61, 62 are accessible through recesses 63, 64, which extend axis parallel through the outer part of the friction member 17 up to the end face on the right in FIG. 1. Due to rotation of the friction member 17, these recesses 63, 64 may be brought alternately into alignment with the heads of the screws 60, 61, 62, so that the screws 60, 61, 62 can be inserted at this point and tightened with a screwdriver.

The angle by which the friction member 17 can be rotated for adjusting the temperature of the mixed water flowing out, is adjustable in the following manner:

Directly adjoining the outside of the groove 58 (thus in FIG. 4 above the latter) a further recess 65 is provided in the outer contour of the friction member 17, but which recess has a greater diameter than the groove 58 and is not guided completely around the periphery of the friction member 17. On the contrary, as can be seen from FIG. 6, a dove-tailed projection 66 projects radially outwards from the "core" 67 of the friction member 17. This dove-tailed projection 66 restricts the ability of the friction member 17 to rotate in clockwise direction in FIG. 6, in that it comes to bear against the head of the screw 60.

A curved slot 68 passes through the wall between the annular shoulder, which is formed by the recess 65 towards the partial region of the friction member 17 supporting the apron 20, and the outer end wall of the friction member 17 surrounded by the apron 20, on which the magnetic coil 14 is also fitted. A screw 69 is guided from outside through this slot 68, which screw secures a stop member 70 on the aforementioned annular shoulder of the recess 65. The stop member 70 extends radially from the "core" 67 of the friction member 17 towards the outer periphery of the annular shoulder formed by the recess 65. It restricts the ability of the friction member 17 to rotate in counterclockwise direction, in that it comes to bear against the head of the screw 60. As is shown, the entire angle of rotation, which the frictional member 17 is able to cover, is defined by the variable position of the stop member 70 in the curved slot 68.

If the friction member 17 with the pilot-controlled valve 29 located therein and the magnetic coil 14 actuating the latter is fixed by means of the U-shaped fastening part 59 and the screws 60 to 62 to the main housing 1, the housing 18 is slid onto the apron 20 of the friction member 17 and fastened there by a screw 19. A cylindrical collar 71 screwed to the housing 18, which could also be in one piece with the housing 18, thus engages in a groove in the side face of the main housing 1 on the right in FIG. 1. In this respect the conditions are identical to the manner in which the outer housing 52 of the handle-like attachment 6, on the left in FIG. 1, engages in a groove on the left-hand side face of the main housing 1.

Finally, the head of the screw 19 in the handle 18 is covered by a window 48, whereof the appearance corresponds to the window 8 in the handle-like attachment 6 on the left in FIG. 1. As can be seen from FIG. 1, a completely symmetrical appearance is thus provided externally.

The main housing 1 is attached to the base part 2 by a central screw 72 (FIG. 2), whereof the head lies in the upper region in the aforementioned bore 25, which guides mixed water flowing from the cylindrical chamber 21 to the outlet 3. The path of the water in a downwards direction is blocked in FIG. 2 by a gasket 73, which is located between the head of the screw 72 and the annular shoulder of the bore 25 located therebelow.

For fastening the outlet 3 to the main housing 1, a fixing socket 74 is screwed into the latter from above. In the upper region, the fixing socket 74 has a somewhat larger diameter and in this case bears by way of O-rings against the inner wall of the outlet 3. The latter is pushed over the fixing socket 74 close up to the upper end face of the main housing 1. A U-shaped fixing part 75 lies between the inner wall of the outlet 3 and the region of the fixing socket 74 of reduced diameter. The outlet 3 is fixed thereto by means of a screw 76. The fixing part 75 bears by a projection 77 extending in the axial direction, against an annular step, which connects the region of the fixing socket 74 of enlarged diameter to the region of smaller diameter. Due to this the outlet 3 is fixed in the axial direction. Due to corresponding profiling of the outer contour of the fixing socket 74, the axial projection 77 simultaneously acts as a limitation for the angle of rotation, which the outlet 3 may traverse with respect to the main housing 1.

The above-described embodiment related to an electrically operated mixer tap system controlled in a non-contacting manner with a certain distribution of the various components to two handle-like attachments. However, the non-contacting operation and this aforedescribed distribution are not necessary features of the invention.

We claim:

1. Sanitary mixer tap system with a housing, with an electrically operated valve, whereof the closing members control the mixed water flowing out, with a regulating member disposed in a chamber of the housing, which determines the ratio of cold and hot water in the mixed water flowing out, and with an outlet, characterised in that
   a) the regulating member is constructed as a hollow piston (17),
   b) on its outer periphery the hollow piston (17) has a structure (27), which in cooperation with flow paths (22, 23) for cold and hot water opening into the housing chamber (21), determines the mixing ratio thereof;
   c) the path of the mixed water leads at least partly through the interior of the hollow piston (17) and located in this region of the interior of the hollow piston (17) are at least the closing members (30, 34) of the electrically operated valve (29, 14).

2. Sanitary mixer tap system according to claim 1, characterised in that formed on the hollow piston (17) is a cylindrical apron (20), to which an actuating handle (18) can be attached.

3. Sanitary mixer tap system according to claim 1, in which the electrically operated valve comprises a magnetic coil, characterised in that the magnetic coil (14) is located in the space surrounded by the apron (20) of the hollow piston (17).

4. Sanitary mixer tap system according to claim 1 characterised in that the structure on the outer periphery of the hollow piston (17) comprises a groove (27), which guides the mixed water along the outside of the hollow piston (17).

5. Sanitary mixer tap system according to claim 4, characterised in that the groove (27) guides the mixed water to the open end of the hollow piston (17).

6. Sanitary mixer tap system according to claim 1, in which the regulating member is constructed as a rotary piston, characterised in that a groove (27) is guided in the manner of a coil along the outer periphery of the hollow piston (17) at an angle with respect to the axis and that the centre points of the openings of the flow paths (22, 23) for cold and hot water in the housing chamber (21), are located on a straight line, which is parallel to the axis of rotation of the hollow piston (17).

7. Sanitary mixer tap system according to claim 3, in which the electrically operated valve is a pilot-controlled valve, which comprises a resilient diaphragm as the closing member, which is able to move to and fro between an open and a closed position under the influence of the pressures prevailing on its two sides, in which case a closing body able to move by means of the magnetic coil influences the pressures on both sides of the diaphragm by opening and closing a pilot opening, characterised in that the closing body (42) and pilot opening (41) are disposed at a distance from the diaphragm (30) in the vicinity of the magnetic coil (14), that from the pilot opening (41) a first channel (43) leads through a solid region of the hollow piston (17) into a chamber (44), in which the pressure prevailing on one side of the diaphragm (30) is present, and that from the chamber (40), which after the lifting of the closing body (42) from the pilot opening (41) becomes connected to the first channel (43), a second channel (39) is guided through a solid region of the hollow piston (17) into a chamber, in which the pressure prevailing on the other side of the diaphragm (30) exists.

8. Sanitary mixer tap system according to claim 1, characterised in that the closing members of the electrically operated valve (29, 14) comprise:
    a) a tubular, resilient diaphragm (30), which is fixed at its ends to the inner wall of the hollow piston (17) and is able to move radially in the central region;
    b) an abutment member (34) disposed within the tubular, resilient diaphragm (30), against the surface of which the diaphragm (30) bears in the closed position and from the surface of which the diaphragm (30) lifts in the open position.

9. Sanitary mixer tap system according to claim 8, characterised in that the abutment member (34) is part of a cage (31) holding the diaphragm (30), which at the axial ends respectively comprises a support ring (35, 36), which cooperates with a radial flange (32, 33) on the corresponding axial ends of the diaphragm (30), the two support rings (35, 36) being connected by way of ribs (37) to the abutment member (34).

* * * * *